M. P. ISMAY & J. W. ROBINSON.
APPARATUS FOR ROLLING MEAT AND LIKE SUBSTANCES.
APPLICATION FILED JUNE 7, 1912.

1,056,422.

Patented Mar. 18, 1913.

3 SHEETS—SHEET 1.

Witnesses
C. A. Walter
L. G. Anger

Inventors
Matthew Parker Ismay
John Walton Robinson
by R. Halday
Attorney

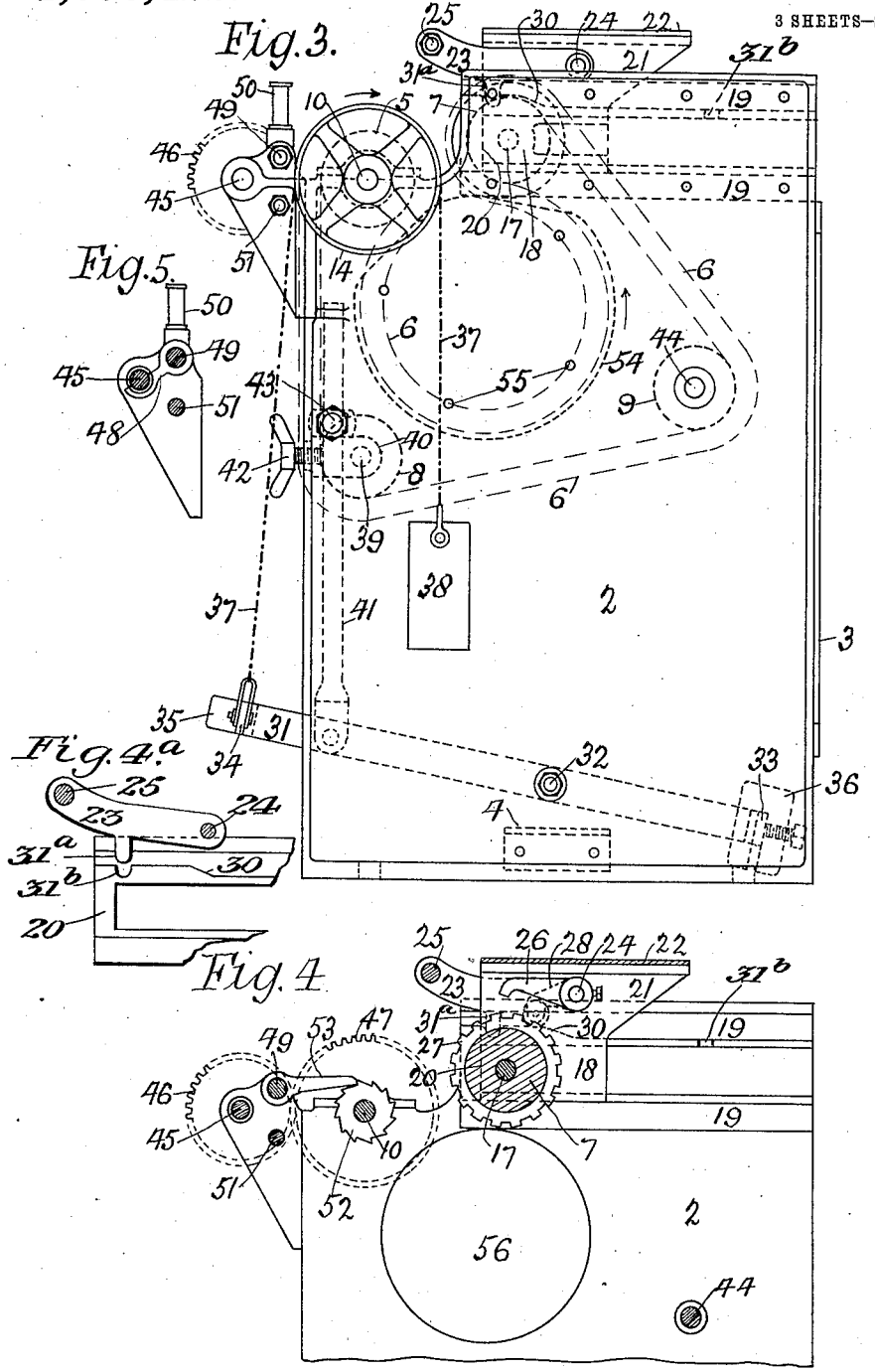

M. P. ISMAY & J. W. ROBINSON.
APPARATUS FOR ROLLING MEAT AND LIKE SUBSTANCES.
APPLICATION FILED JUNE 7, 1912.
1,056,422.
Patented Mar. 18, 1913.
3 SHEETS—SHEET 3.
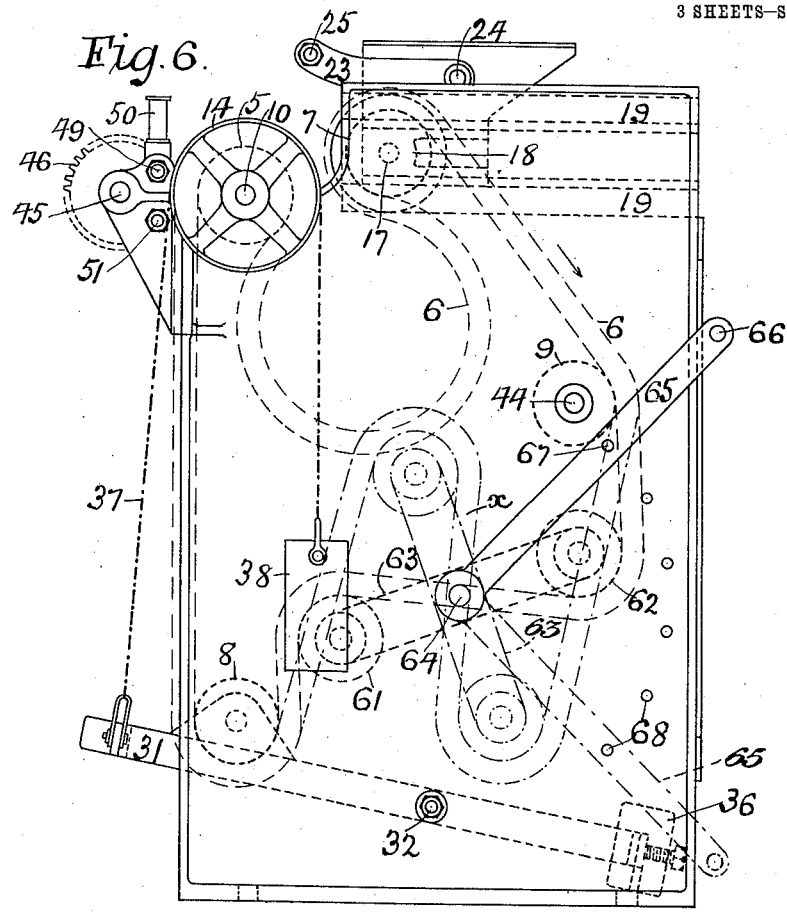
Fig. 8.
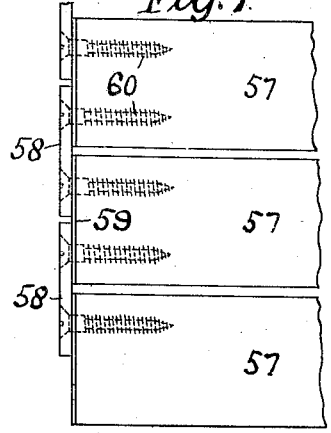
Fig. 7.
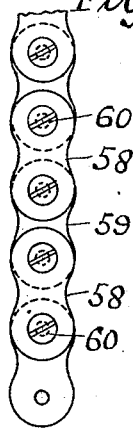
Fig. 9.
Witnesses
C. H. Walter
L. G. Anger
Inventors
Matthew Parker Ismay
John Walton Robinson
by A. Hadday
Attorney
COLUMBIA PLANOGRAPH CO., WASHINGTON, D. C.

UNITED STATES PATENT OFFICE.

MATTHEW PARKER ISMAY, OF NEWCASTLE-UPON-TYNE, AND JOHN WALTON ROBINSON, OF HAYDON BRIDGE, ENGLAND.

APPARATUS FOR ROLLING MEAT AND LIKE SUBSTANCES.

1,056,422.      Specification of Letters Patent.      Patented Mar. 18, 1913.

Application filed June 7, 1912. Serial No. 702,253.

*To all whom it may concern:*

Be it known that we, MATTHEW PARKER ISMAY and JOHN WALTON ROBINSON, subjects of the King of England, residing, respectively, at Newcastle-upon-Tyne and Haydon Bridge, both in the county of Northumberland, in England, have invented certain new and useful Improvements in Apparatus for Rolling Meat and Like Substances, of which the following is a specification.

This invention relates to improvements in apparatus for rolling meat such as hams, shoulders and sides of bacon, beef or the like, of that class, wherein the meat is rolled by a band formed of links and traveling over rollers in the machine.

A certain amount of slack is provided in the band, the meat being rolled in the loop formed by this slack and which hangs between rollers, one of which is adjustable relatively to the other to allow the introduction into the loop of the meat to be rolled and to tighten the loop around the meat, means being provided whereby as the meat becomes more compact the band is kept tight around the same.

The present invention provides improved means for keeping the band tight around the meat or other substance being rolled, these means being operated by pressure on a foot-lever which at the same time operates clutch mechanism for starting the machine. Immediately the pressure on the foot lever is removed the clutch mechanism is automatically disengaged and the machine stops.

The invention further consists in improved means for guiding the adjustable roller, partly supporting the loop toward or away from the driving roller to allow the insertion of the meat and the initial tightening of the loop around the same.

The invention further comprises minor details of construction as will hereinafter be described and specifically pointed out in the appended claims.

An embodiment of the machine is shown in the annexed drawings, in which—

Figure 1:
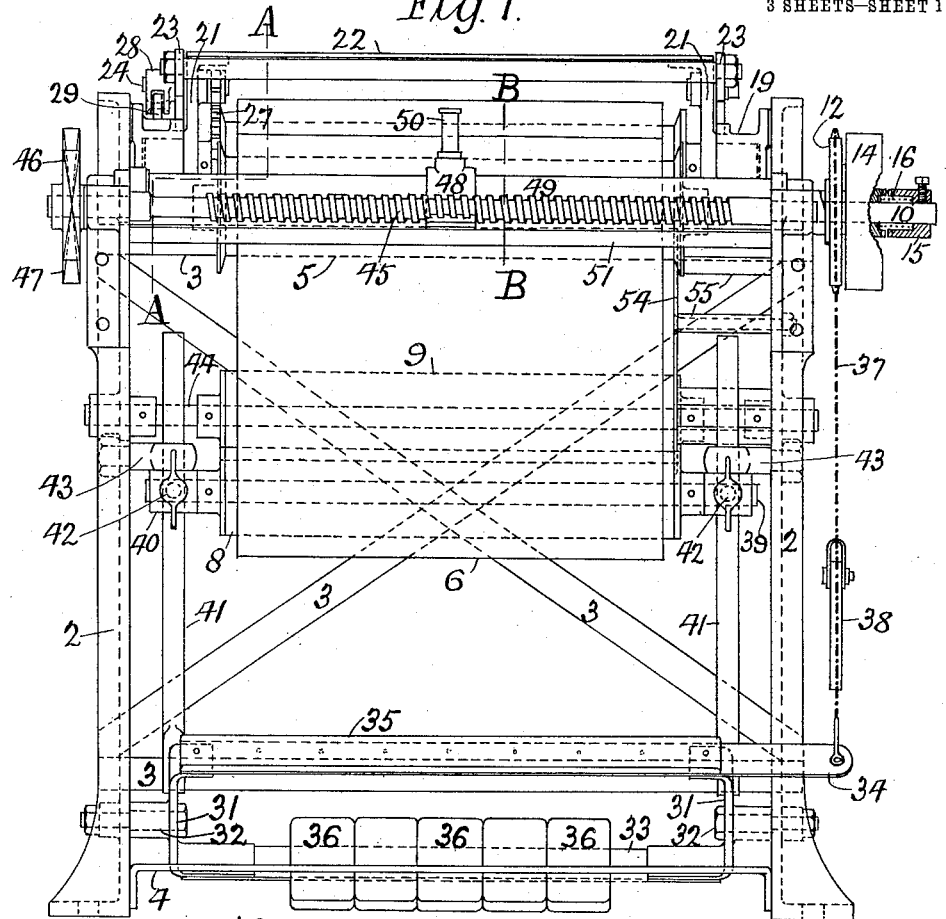
Figure 2:
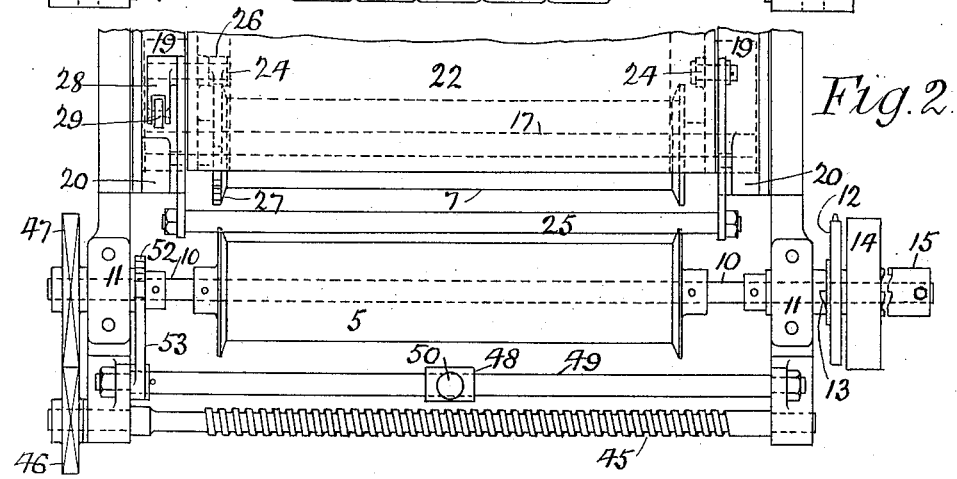

Figure 1 is a front elevation of the improved machine; Fig. 2 is a partial plan view of the same; Fig. 3 is a side elevation; Fig. 4 is a section on line A—A of Fig. 1. Fig. 4ª is a detail section taken approximately on line A—A of Fig. 1, certain parts being omitted for clearness. Fig. 5 is a section on line B—B of Fig. 1. Fig. 6 is a side elevation similar to Fig. 3, and illustrates an alternative method of taking up the slack of the rolling band; Figs. 7, 8, 9, are details of construction of the band on an enlarged scale.

Between the vertical sides or cheeks 2 of framing braced together by bars 3 at the back and bars 4 at the bottom, a number of horizontal rollers of suitable length and made of wood or other suitable material are carried or supported. Of these rollers, the upper front roller 5 is the driver, and is grooved or otherwise roughened to grip the band 6; its shaft 10 is carried in fixed bearings 11 on the frame.

7 is the upper back roller at a higher level than the front roller, and its spindle 17 is carried in bearings 18 adapted to slide in horizontal guides 19 bolted to or integral with the frame, the range of slide extending from a point where the two rollers 5 and 7 come comparatively close to each other back to a point which leaves a space between the rollers sufficient to admit the largest sized piece of meat or the like to be rolled. The forward ends of guides 19 are made solid as at 20 and act as stops for the bearings 18 which are provided with vertical extensions 21 joined by a horizontal plate 22 which serves as a shelf. The bearings 18 may be coupled together in any other suitable manner. A third roller 8 is located below the roller 5, and its spindle 39 is carried in bearings 40 adapted to be moved up and down upon vertical rods 41 connected to a foot lever described hereinafter and fixed on said rods by set bolts 42, the vertical rods moving in guides 43 fixed to the frame; a fourth roller 9 is arranged toward the back of the machine at a suitable level, and its spindle 44 is carried in fixed bearings on the frame. The endless band 6 of suitable material passes over all the rollers mentioned so that the same surface of the band comes against all said rollers. A certain amount of slack is provided in the band for holding the meat and this slack falls down between the upper two rollers 5 and 7 and forms a loop in the band 6, in which loop the meat is rolled. The amount of slack is made to suit the size of meat to be rolled, and is regulated by adjusting the roller 8. The band may be constructed of bars of hard wood of tapered section placed parallel and close to each other but not necessarily touching and the ends connected by metallic links, but we may make the bars 57 of uniform section as illustrated in Figs. 7 and 8 instead of tapered section. The band passes over the upper two rollers 5 and 7 and under the lower two rollers 8 and 9.

The foot lever before referred to consists of two arms 31 inside of and pivoted at 32 to the respective side frames 2, a bar 33 joining the back ends of said arms and another bar 34 joining the front ends thereof the said front bar 34 being provided with a strip 35 made of wood. Balance weights 36 are placed on the rear end of the bar 33, and the band is tightened during operation of the machine by pressing the foot on the front member 35. On one end of the driving shaft 10, and outside the side frame bearing is a sprocket wheel 12 provided with inclined faces or teeth 13 (Fig. 2) to engage recesses in the face of the bearing. A belt sheave 14 is mounted on shaft 10 and is driven by any suitable power, the said sheave being provided with teeth to engage a clutch 15 of suitable type for coupling the belt sheave. The sprocket wheel 12 and the belt sheave 14 ride loosely on the shaft 10 and a helical spring 16 is interposed between the clutch 15 and the belt sheave to keep the boss of the belt sheave pressed against the boss of the sprocket wheel and the latter against the face of the bearing. A chain 37 is connected to the bars 34 of the foot lever and passes over the sprocket wheel 12, a balance weight 38 being attached to the other end of said chain. When the sprocket wheel is turned by pressing the foot lever the said wheel is forced away from the bearing by means of the inclined faces. This moves the belt sheave 14 along the shaft 10, compresses the spring 16 and the sheave engages with the clutch 15. As long as the pressure is exerted on the foot lever the machine will be working. Directly such pressure is removed, the spring 16 throws the clutch 15 out of gear, and the machine stops. A ratchet wheel 52 engaged by a pawl 53 mounted on a cross bar 49 is provided at one or both ends of the driving shaft 10 to prevent the roller 5 turning when the machine is not working. A forwardly projecting arm 23 is pivoted on pins 24 to each of the vertical extensions 21 of the sliding bearings 18 and the front ends of said arms are joined by a bar or bolt 25, by means of which the roller 7 can be moved backward or forward.

On one or both pivot pins 24, and on the insides of the extensions 21 is mounted a pawl 26 (one being shown) which engages a ratchet wheel 27 fixed on the spindle 17. This pawl is lifted out of gear with the ratchet wheel 27 by the action of a lever 28 mounted on the pin 24 outside extension 21 and provided at its end with a roller 29 which bears on the upper outer surface of bearing guide 19. This surface is inclined or raised as at 30 sufficiently to throw the pawl 26 out of gear with the ratchet wheel 27.

31ª is a downward projection on the arm 23 engaging in notches in the guide 19 to fix the roller 7 is position. On the drawing, notches for the forward position of the roller 7 only are shown, but may be provided for the back or any other positions.

The means for stringing the meat after rolling consists of a screw threaded bar 45 parallel to and in front of the driving shaft 10, and driven by means of a toothed wheel 46 thereon from a toothed wheel 47 on the driving shaft at a speed depending on the diameter of the roll of meat and the distance apart of the coils of string on said roll. A half-nut 48 adapted to engage the screw threaded bar 45 is slidably mounted on a bar 49 parallel to and behind the bar 45. The nut 48 has a vertical extension 50 around which one or more turns of string are taken after the latter has been attached to the meat. Normally the half nut falls out of engagement with the bar 45 and is put in engagement by the attendant pressing on the vertical extension 50. At the same time the string is passing through his hand and he can easily adjust the pull on the same.

51 is a stay bar which acts as a stop for the half nut 48 when out of gear with the screw threaded bar 45.

54 is a plate for keeping the end of the meat flat while being rolled said plate being carried by stays 55 passing through one side frame 2.

56 is an aperture in the opposite side frame. The band 6 see Fig. 7, is made of bars 57 of hard wood connected by links 58, 59 and screws 60.

Instead of adjusting the length of slack of the band by moving the roller 8 as directed above we may mount this roller in a suitable position and provide two additional rollers 61 and 62, Fig. 6, carried on spindles on the ends of two levers 63 of suitable length, each lever being centrally mounted on pins 64, one on each side frame 2. This is effected by arms 65 fixed on pins 64 outside each side frame and joined by a bar 66. The levers 63 are kept in the required position by a pin engaging in a hole 67 in the lever 65 and in one of the holes 68 in side frame 2. The greatest amount of slack in the band between the rollers 5 and 7 is when the lever 63 is near the horizontal position and the arm 65 in its raised position. The least amount of slack in the band is when the lever 63 is near the vertical as indicated by $x$ and arm 65 in its lower position; the arrows in Figs. 3 and 6 indicate the direction of travel of the band, which passes under the third roller 8 as before, over the first additional roller 61, under the second additional roller 62, and around the back roller 9.

The action of the machine is as follows:— Before putting in the meat to be rolled, the machine is stationary, the belt sheave 14 running loosely on its shaft. Roller 7 is in its rearmost position, and the slack band is hanging down between rollers 5 and 7. When the roller 7 is in the said rearward position, and also in any other position but its foremost one, the pawl 26 is in engagement with the wheel 27, and the roller 7 is prevented from rotating. The driver roller 5 is also prevented from rotating by the pawl 53 engaging the wheel 52. After fastening the string to the thick end of the meat, the latter is doubled longitudinally and placed in loop 6 of the band with the thick end pressed against the plate 54. The roller 7 is drawn forward to the position shown in the drawings and the string is coiled once or twice around projection 50 by the operator who lets the string run through his hand from the source of supply, and can control the tension on the string at will. He then presses with his foot on the front member 35 of the foot lever, which action tightens the band, and at the same time by means of the chain 37 turns the wheel 12 through a certain angle which by means of the inclined teeth 13 forces said wheel and the belt sheave 14 along shaft 10 causing the sheave 14 to engage the clutch 15. The band is thus put in motion and the meat rolled. The stringing is done by pressing the projection 50 to bring the nut 48 into mesh with the screw 45, and it is held in mesh during the travel of the string from one end of the meat to the other. The travel of the string is stopped by taking the pressure off said projection 50, and the rolling of the meat is stopped by lifting the foot from bar 35 whereupon the wheel 12 at once rotates in the opposite direction until the inclined teeth 13 cause the sheave 14 to be thrown out of gear with clutch 15 by the spring 16. The roller 7 is then thrust back and the meat lifted out.

What we claim as our invention and desire to secure by Letters Patent of the United States is:—

1. In apparatus for rolling meat and like substances, the combination of a traveling band having a loop in which the substance is rolled, pedal operated means for varying the pressure of said loop on the substance within same, and mechanism actuated by said pedal operated means for starting and stopping the apparatus.

2. In apparatus for rolling meat and like substances, the combination of a traveling band having a loop in which the substance is rolled, a roller adapted to tension said loop to vary the pressure thereof on the substance within same, an adjustable bearing member in which said roller is mounted and pedal operated means in operative connection with said bearing member.

3. In apparatus for rolling meat and like substances, the combination of a traveling band having a loop in which the substance is rolled, a driving roller for said band, chain and chain wheel mechanism in operative connection with said driving roller, a foot lever adapted to actuate said mechanism in one direction, a driving shaft, a belt sheave thereon, one way actuating clutch mechanism actuated by the chain wheel adapted to couple said sheave to the driving shaft and a load on the chain adapted to actuate the chain wheel mechanism in the opposite direction to release said sheave from the shaft.

4. In apparatus for rolling meat and like substances, the combination of a traveling band having a loop in which the substance is rolled, rollers supporting said band including a stationarily mounted driving roller, and a roller mounted in movable bearings, means for manually adjusting said bearings and means for retaining same in adjusted position.

5. In apparatus for rolling meat and like substances, the combination of a traveling band having a loop in which the substance is rolled, rollers supporting said band including a stationarily mounted driving roller and a roller mounted in movable bearings, means for manually adjusting said bearings, means for preventing rotation of said roller until its bearings reach one end position of adjustment and means for automatically releasing said preventing means when such position is reached.

6. In apparatus for rolling meat and like substances, the combination of a traveling band having a loop in which the substance is rolled, rollers supporting said band including a stationarily mounted driving roller and a roller mounted in movable bearings, means for manually adjusting said bearings, means for retaining same in adjusted position, means for preventing rotation of said movable roller until its bearings reach one end position of adjustment and pedal operated means acting on one of said supporting rollers for varying the slack of the aforesaid loop.

7. In apparatus for rolling meat and like substances, the combination of a traveling band having a loop in which the substance is rolled, rollers supporting said band including a stationarily mounted driving roller and a roller mounted in movable bearings, means for manually adjusting said bearings, means for retaining same in adjusted position, means for preventing rotation of said movable roller until its bearings reach one end position of adjustment, pedal operated means acting on one of said supporting rollers for varying the slack of the aforesaid loop, and clutch mechanism actuated by the pedal operated means for starting and stopping the apparatus.

8. In apparatus for rolling meat and like substances, the combination of a traveling band having a loop in which the substance is rolled, rollers supporting said band including a stationarily mounted driving roller and a roller mounted in movable bearings, means for manually adjusting said bearings, means for retaining same in adjusted position, means for preventing rotation of said movable roller until its bearings reach one end position of adjustment, pedal operated means acting on one of said supporting rollers for varying the slack of the aforesaid loop, chain and chain wheel mechanism in operative connection with the driving roller and actuated by the pedal operated means in one direction, a driving shaft, a belt sheave thereon, one way actuating clutch mechanism actuated by the chain wheel adapted to couple said sheave to the driving shaft and a load on the chain adapted to actuate said chain wheel mechanism in the opposite direction to release the sheave from the shaft substantially as described.

9. In apparatus for rolling meat and like substances, the combination of a traveling band having a loop in which the substance is rolled, and pedal operated means for varying the pressure of said loop on the substance therein.

10. In apparatus for rolling meat and like substances, the combination of a traveling band having a loop in which the substance is rolled, and means for rendering the apparatus operative or inoperative while simultaneously varying the pressure of said loop on the substance therein.

In witness whereof we have signed this specification in the presence of two witnesses.

MATTHEW PARKER ISMAY.
JOHN WALTON ROBINSON.

Witnesses:
CHARLES STEPHEN GARDNER,
H. NIXON.

---

Copies of this patent may be obtained for five cents each, by addressing the "Commissioner of Patents, Washington, D. C."